US009172739B2

(12) United States Patent
Berman et al.

(10) Patent No.: US 9,172,739 B2
(45) Date of Patent: Oct. 27, 2015

(54) ANTICIPATING DOMAINS USED TO LOAD A WEB PAGE

(71) Applicant: Google Inc., Mountain View, CA (US)

(72) Inventors: Vadim Berman, Belmont, CA (US); Nikita Kostylev, Moscow (RU)

(73) Assignee: Google Inc., Mountain View, CA (US)

( * ) Notice: Subject to any disclaimer, the term of this patent is extended or adjusted under 35 U.S.C. 154(b) by 263 days.

(21) Appl. No.: 13/656,557

(22) Filed: Oct. 19, 2012

(65) Prior Publication Data

US 2013/0054747 A1 Feb. 28, 2013

Related U.S. Application Data

(63) Continuation of application No. PCT/RU2012/000558, filed on Jul. 10, 2012.

(60) Provisional application No. 61/523,229, filed on Aug. 12, 2011.

(51) Int. Cl.
*G06F 15/16* (2006.01)
*H04L 29/08* (2006.01)
*H04L 29/06* (2006.01)

(52) U.S. Cl.
CPC ............ *H04L 67/02* (2013.01); *H04L 69/28* (2013.01)

(58) Field of Classification Search
CPC ....... H04W 21/01; H04L 67/02; H04L 69/28; G06F 15/16; G06F 17/3089
USPC .................................. 709/217, 218; 713/167
See application file for complete search history.

(56) References Cited

U.S. PATENT DOCUMENTS

| | | | | |
|---|---|---|---|---|
| 6,128,651 | A * | 10/2000 | Cezar | 709/217 |
| 7,346,922 | B2 * | 3/2008 | Miliefsky | 726/3 |
| 8,676,273 | B1 * | 3/2014 | Fujisaki | 455/567 |
| 2007/0067297 | A1 * | 3/2007 | Kublickis | 707/9 |
| 2009/0187763 | A1 * | 7/2009 | Freericks et al. | 713/167 |
| 2010/0005001 | A1 * | 1/2010 | Aizen et al. | 705/14.73 |
| 2010/0146415 | A1 | 6/2010 | Lepeska | |
| 2010/0287041 | A1 * | 11/2010 | Desikan et al. | 705/14.4 |
| 2011/0040777 | A1 | 2/2011 | Stefanov | |
| 2011/0153867 | A1 | 6/2011 | van de Ven et al. | |
| 2012/0296713 | A1 * | 11/2012 | Abdulhayoglu | 705/14.4 |
| 2012/0303542 | A1 * | 11/2012 | Marcus et al. | 705/330 |
| 2013/0281215 | A1 * | 10/2013 | Jung | 463/42 |
| 2014/0007205 | A1 * | 1/2014 | Oikonomou | 726/6 |

FOREIGN PATENT DOCUMENTS

WO WO-2010025373 A1 3/2010

* cited by examiner

*Primary Examiner* — Tesfay Yohannes
(74) *Attorney, Agent, or Firm* — McDermott Will & Emery LLP

(57) ABSTRACT

Aspects of the subject technology are related to systems and methods for anticipating content domain names to be used by a browser. A system may be configured to detect network events while one or more web pages associated with a domain name are being loaded, identify, based on the network events, one or more content domain names that are associated with the domain name, and storing, in a data repository, associations of the one or more content domain names with the domain name. The associations of the one or more content domain names in the data repository may be used to initiate a Domain Name System (DNS) request for at least one of the one or more content domain names when a subsequent web page associated with the domain name is loaded by a browser.

17 Claims, 7 Drawing Sheets

400

ANTICIPATING DOMAINS USED TO LOAD A WEB PAGE

RELATED APPLICATION

This application is a continuation of International Application No. PCT/RU2012/000558, filed Jul. 10, 2012, entitled "ANTICIPATING DOMAINS USED TO LOAD A WEB PAGE," which claims priority to U.S. Provisional Patent Application No. 61/523,229, filed on Aug. 12, 2011, entitled "METHOD AND SYSTEM FOR ANTICIPATING DOMAINS NEEDED TO LOAD A WEB PAGE," the entire contents of which are herein incorporated by reference in their entirety.

BACKGROUND

The Domain Name System (DNS) is a naming system designed to translate domain names meaningful to humans into numerical identifiers that may be used by networking equipment to locate resources on the internet. A user typically directs a web browser to access a resource (e.g., a web page) by providing a Uniform Resource Locator (URL) to the browser that contains a domain name. In order to access the resource, the browser needs to translate the domain name into an internet protocol (IP) address using a DNS service. For example, a web page may be associated with a URL "http://www.news.com/US/" which contains the domain name of the web page "www.news.com." In order to locate and access the web page, the browser must request from a DNS service a translation of the domain name of the web page "www.news.com" to an IP address (e.g., 74.125.224.135).

Even after a web page is retrieved, the browser may need to translate domain names in the web page content itself. For example, the web page content may contain content elements (e.g., images, advertisements, dynamic content, web page elements, etc.) that may need to be downloaded from various content domain names (e.g., images.news.com, money.news.com, www.ads.com, etc.). In order to correctly display the web page "http://www.news.com/US/," the various content domain names also need to be translated into IP addresses by sending DNS requests to a DNS service (e.g., a DNS server or a local DNS service).

However, translating the content domain names into IP addresses only after they have been identified in the content of the web page may take a considerable amount of time.

SUMMARY

Aspects of the subject technology are related to a system for anticipating content domain names to be used by a browser. The system may include one or more processors and a machine-readable medium comprising instructions stored therein, which when executed by the one or more processors, cause the one or more processors to perform operations. The operations may include loading a first web page associated with a domain name, scanning content of the first web page to identify content domain names in the first web page or detecting network events associated with the loading of the first web page, wherein the network events are associated with one or more content domain names used in the loading of the first web page, and wherein the scanning of the content or the detecting of the network events is based on an performance metric associated with a scanning method for anticipating content domains, and storing, in a data repository, associations of the one or more content domain names with the domain name of the first web page. In a subsequent loading of a second web page associated with the domain name of the first web page, the stored associations are retrieved to automatically initiate a Domain Name System (DNS) request for at least one of the one or more content domain names, and wherein the DNS request is automatically initiated before the browser has requested the DNS request for the second web page.

Aspects of the subject technology are related to a method for anticipating content domain names to be used by a browser. The method may include loading a first web page associated with a domain name, scanning content of the first web page to identify content domain names in the first web page or detecting network events associated with the loading of the first web page, wherein the network events are associated with one or more content domain names used in the loading of the first web page, and wherein the scanning of the content or the detecting of the network events is based on an average amount of time needed to perform a scanning method for anticipating content domains, and storing, in a data repository, associations of the one or more content domain names with the domain name of the first web page. In a subsequent loading of a second web page associated with the domain name of the first web page, the stored associations are retrieved to automatically initiate a Domain Name System (DNS) request for at least one of the one or more content domain names, and wherein the DNS request is automatically initiated before the browser has requested the DNS request for the second web page.

Aspects of the subject technology are also related to a machine-readable medium including instructions stored therein, which when executed by a machine, cause the machine to perform operations for anticipating content domain names to be used by a browser. The operations may include loading a first web page associated with a domain name, scanning content of the first web page to identify content domain names in the first web page or detecting network events associated with the loading of the first web page, wherein the network events are associated with one or more content domain names used in the loading of the first web page, and wherein the scanning of the content or the detecting of the network events is based on an average amount of time needed to perform a scanning method for anticipating content domains, and storing, in a data repository, associations of the one or more content domain names with the domain name of the first web page. In a subsequent loading of a second web page associated with the domain name of the first web page, the stored associations are retrieved to automatically initiate a Domain Name System (DNS) request for at least one of the one or more content domain names, and wherein the DNS request is automatically initiated before the browser has requested the DNS request for the second web page.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

Figure 1:
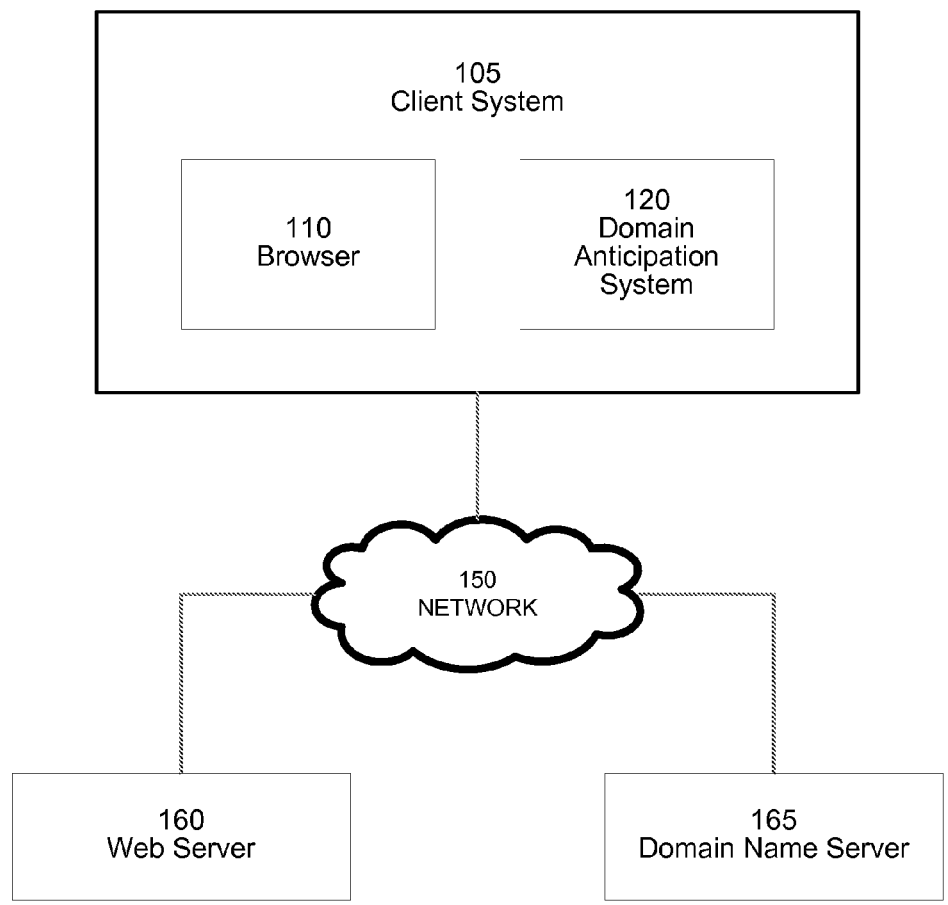
FIG. 1 is a block diagram illustrating an example environment for anticipating content domain names associated with a web page domain name, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Web browsers may retrieve web resources (e.g., a web page) based on a Uniform Resource Locator (URL) containing a domain name. Each web resource may contain content elements (e.g., images, advertisements, dynamic content, audio content, web page elements, etc.) that may also need to be retrieved from content domain names. In order to retrieve the content elements, a web browser may first translate the content domain names in the web resource into Internet Protocol (IP) addresses and then retrieve the content elements using the IP address.

However, translating the content domain names into IP addresses only after they have been identified in the content of the web page may take a considerable amount of time. For example some browsers may 1) receive a URL of a web page to be loaded, 2) translate the URL into an IP address, 3) retrieve or download the web page using the IP address and URL path component, 4) process the contents of the downloaded web page in order to identify the content domain names needed to retrieve the content elements to be used in the web page, then 5) initiate requests to translate the content domain names into IP addresses, and, after the content domain names are translated, 6) retrieve the content elements from their respective sources. Furthermore, in some cases, only a limited number of translation requests may be initiated at a particular moment.

Various aspects of the subject technology relate to systems and methods for anticipating content domain names used to load a web page. According to one aspect, the content domain names used to load a web page may be anticipated by monitoring one or more computing devices while the one or more computing devices are loading the a web page and detecting network events associated with a domain name of the web page. In another aspect, the contents of a web page may be scanned in order to identify content domain names used to load the web page.

An association of the identified content domain names and the domain name of the web page being loaded may be stored in a data repository and used to anticipate content domain names when web pages having the same domain name are to be loaded. By anticipating the content domain names that may be used to load a web page, the system may, among other things, preemptively initiate requests to translate the content domain names into IP addresses and increase browser performance by providing translated content domain names sooner. Further details and additional aspects of the subject technology are discussed below.

FIG. 1 is a block diagram illustrating an example environment 100 for anticipating content domain names associated with a web page domain name, in accordance with various aspects of the subject technology. The network environment 100 may include, for example, a client system 105, one or more web servers 160, and one or more domain name service (DNS) servers. The client system 105, web servers 160, and DNS servers 165 may all communicate with one another via a network 150, such as the Internet.

The one or more web servers 160 may be configured to store web pages and other web resources and provide them to client systems 105 upon request. However, in order to make a request for web resources, a client system 105 must be able to locate the appropriate web resource using an IP address corresponding to the web resource.

In this regard, the one or more DNS servers 165 may be able to aid the client system 105 in identifying the IP address for the web resource. The one or more DNS servers 165 may be configured to store DNS records that include an association of a domain name and an IP address that corresponds to the domain name. A DNS server 165 may receive requests from client systems 105 to translate a domain name in a URL into an IP address and provide the translation to the client system 105 using the stored DNS records.

The client system 105 may include an application (such as a browser 110 or other client-server application) and a domain anticipation system 120. Although in FIG. 1, the domain anticipation system 120 is shown as being a part of the client system 105 (e.g., part of a browser, a browser plug-in, or a separate application), in other aspects, the domain anticipation system 120 may be separate from the client system 105 and may be configured to monitor the network events for a number of client systems.

The browser 110 may retrieve web resources, such as a web page, and present the web resources to a user. The web resources may be identified using a Uniform Resource Locator (URL) that references a web resource. One example browser that presents a web page to the user is shown in FIG. 2.

Figure 2:
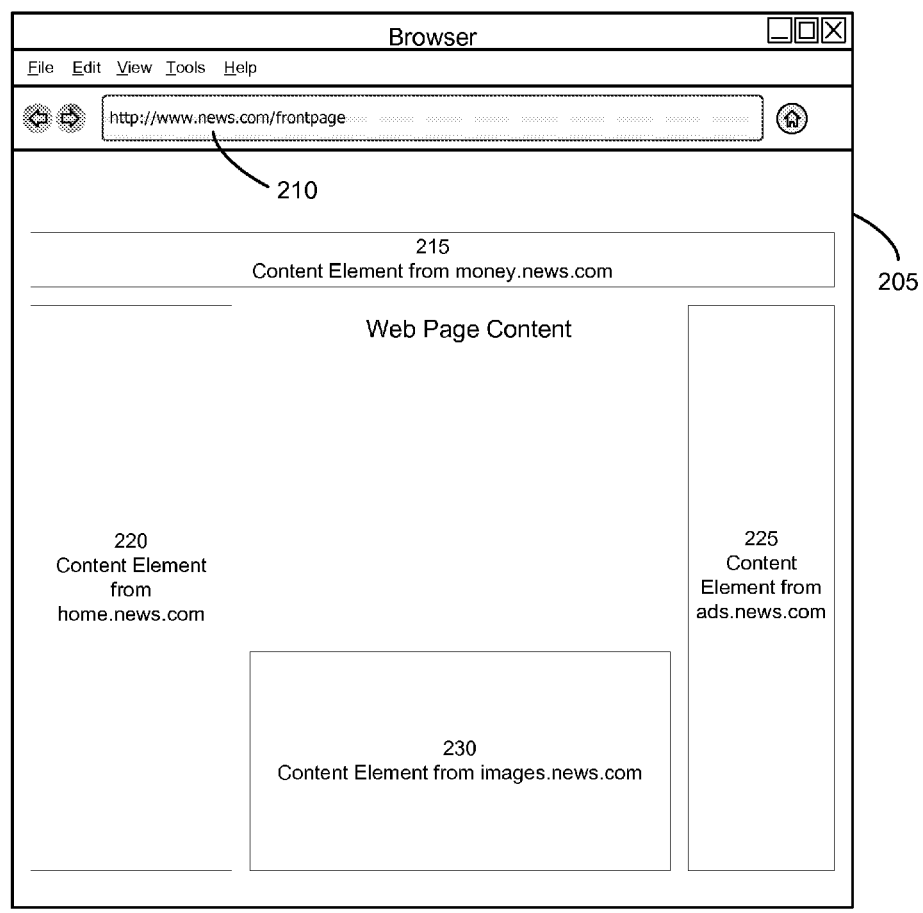
FIG. 2 is a user interface illustrating an example web page displayed in a browser, in accordance with various aspects of the subject technology.

FIG. 2 is a user interface illustrating an example web page 205 displayed in a browser 200, in accordance with various aspects of the subject technology. The web page 205 may be referenced using a URL (http://www.news.com/frontpage)

containing the domain name "news.com" 210. In order to properly display the web page 205 and enable all of the functionalities of the web page 205, the browser 200 may need to download one or more content elements from various content domain names.

Some content elements may be visible when a web page 205 is displayed. For example, FIG. 2 contains content element 215, which may display an interface that has up-to-date stock ticker information, and content element 220, which show a number of relevant links. FIG. 2 also includes one or more images, content element 230, and one or more advertisements, content element 225. In order to be properly displayed, however, the content elements must be downloaded from their respective content domain names: "money.news.com," "home.news.com," "ads.news.com," and "images.news.com."

Other content elements may not be visible when the web page 205 is displayed and may include code for various features of the web page 205. For example, a content element from content domain name "metrics.news.com" may enable data collection and user tracking features for the web page. In order for the features to work properly, the code must also be downloaded from its content domain name, "metrics.news.com."

Referring back to FIG. 1, according to various aspects of the subject technology, the domain anticipation system 120 may be configured to learn and anticipate which content domain names will be used to load a web page by monitoring network events for the client system 105 when the browser 110 on the client system 105 loads web resources. For example, in FIG. 2, the domain anticipation system 120 may detect network events while the web page 205 with a URL containing a particular domain name 210 (e.g., news.com) is being downloaded and displayed by a browser 200.

The network events may be, for example, any network activity for the client system 105 that occurs while the web page is being retrieved and loaded. According to another aspect, the network events may be network events generated or received by the browser 110 or network events directly associated with the loading of the web page (e.g., DNS requests to translate the domain names to an IP address, download requests to download the web page elements based on known IP addresses, etc.).

Based on the detected network events, the domain anticipation system 120 may identify the content domain names requested by the browser 110 (e.g., images.news.com and www.ads.com) or otherwise used to load the web page 205 and associate the identified content domain names with the particular domain name of the web page 205. The associations between the identified content domain names and the web page domain name may be stored in a data repository (e.g., a record in a database or other memory) so that the domain anticipation system 120 may anticipate one or more of the content domain names that will be referenced by a web page.

For example, after the associations are stored, domain anticipation system 120 may determine that the browser 110 is attempting to load a web page using a URL that includes the same domain name ("news.com") or a similar domain name. A similar domain name to "news.com" may include, for example, "sale.news.com," "sports.news.com," or any other sub-domain of "news.com." In response to the attempt to load the web page, the associations in the data repository may be used to anticipate content domains that will be used in the loading of the web page. The domain anticipation system 120 may then automatically begin translating the anticipated content domain names to corresponding IP addresses.

According to one aspect, the domain anticipation system 120 may begin translating the anticipated content domain names before they are typically requested by the browser. For example, the domain anticipation system 120 may start initiating requests to DNS servers to translate the anticipated content domain names before the browser has finished retrieving the web page, before the browser has started processing the content of the web page, or before the browser has identified all of the content domain names that will be used to load the web page.

By identifying anticipated content domain names and automatically initiating the resolution of the content domain names to IP addresses, the domain anticipation system 120 may improve browser 110 performance or reduce the computing resources (e.g., computing time, memory, bandwidth, processing power, etc.) needed to load a web page. In other cases, browsing performance may be improved by taking advantage of computing resources not currently being used.

For example, instead of receiving a URL for a web page or other web resource, determining the IP address associated with the URL, downloading the web page, scanning the content of the web page for content domain names, and then resolving those content domain names, the domain anticipation system 120 may identify the domain name in the URL of the web page, anticipate the content domain names that will be used to load the web page based on the domain name of the web page, and resolve those content domain names. The domain anticipation system 120 may begin resolving the content domain names to IP addresses while the browser is determining the IP address associated with the URL, downloading a web page, and/or scanning the content of the web page for content domain names so that the IP addresses for the content domain names may be retrieved earlier and may be ready for the browser to use to retrieve the web page content elements.

According to another aspect of the subject technology, the domain anticipation system 120 may also learn and predict which content domain names are associated with a particular domain name of a web page by scanning the contents of the web page (e.g., the HTML or other web page code) to identify content domain names needed to load the web page. Associations between the identified content domain names and the domain name of the web page may be stored to help anticipate which content domain names will be referenced by subsequent requests to load a web page.

According to one another aspect, a domain anticipation system 120 may use the network event monitoring technique as well as the web page content scanning technique to anticipate which content domain names may be used to load a web page. These techniques may both be used at the same time, in combination, or separately based on the performance of one or more of the techniques. For example, a domain anticipation system 120 may use a first technique to anticipate content domain names used to load a web page and monitor the performance of the first technique. If the average amount of time needed to perform the first technique exceeds a threshold amount of time, the domain anticipation system 120 may switch to a second technique.

In another aspect, the technique used may be determined automatically based on other criteria or a combination of criteria, such as the complexity of a page. For example one technique may be used if the number of web page elements that need to be scanned is below a threshold number and another technique may be used if the number of web page elements that need to be scanned is at or above the threshold number. In other aspects, other performance metrics may be calculated for the scanning technique or the network event monitoring technique. The performance metrics may be compared against one or more performance standards to determine which technique is to be used.

Figure 3:
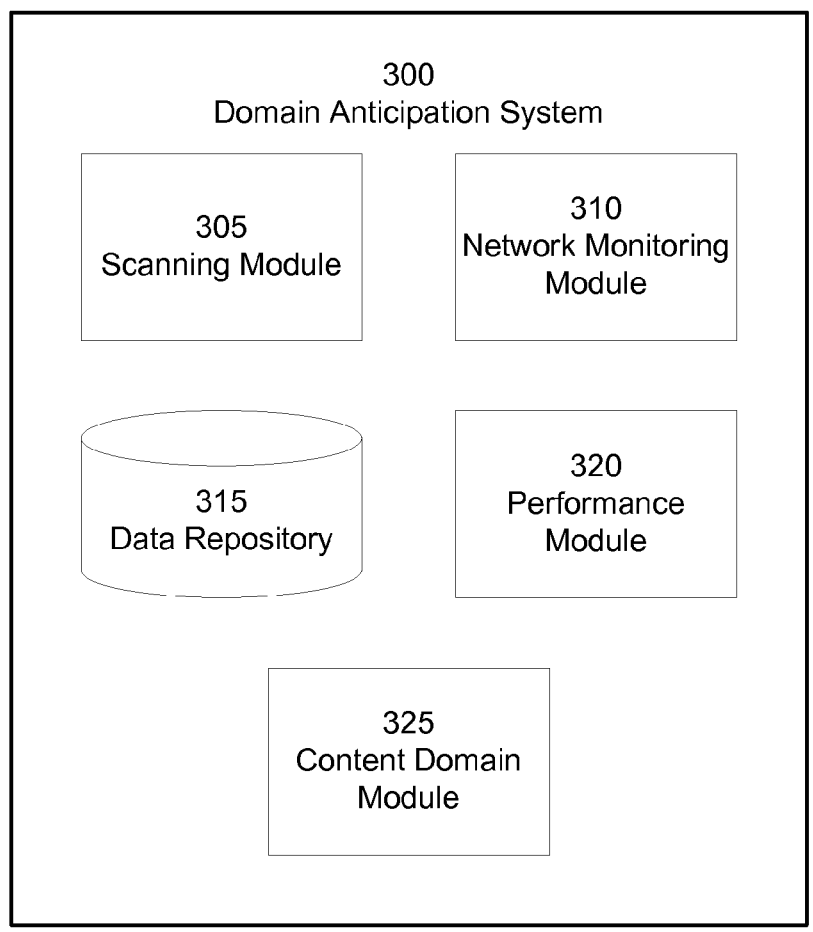
FIG. 3 is a block diagram illustrating an example domain anticipation system, in accordance with various aspects of the subject technology.

For example, FIG. 3 is a block diagram illustrating an example domain anticipation system 300, in accordance with various aspects of the subject technology. The domain anticipation system 300 may include a scanning module 305, a network monitoring module 310, a data repository 315, a performance module 320, and a content domain module 325. While the domain anticipation system 300 is shown in one configuration in FIG. 3, in other configurations, the domain anticipation system 300 may include additional, alternative, and/or fewer components.

The scanning module 305 may be configured to, as described above, scan the contents of a web page when a browser loads the web page and identify references to content domain names in the contents of the web page. This may include searching the source code (e.g., the HTML code) of the web page or any other data that represents the content of the web page (e.g., data that conforms to the Document Object Model and is generated by a web browser) for any content domain name contained therein.

If one or more content domain names are identified in the contents of the web page, the scanning module 305 may update a record for the domain name based on the identified content domain name. The updated record for the domain name, located in the data repository 315, may then be used to anticipate content domain names when other web pages with the same domain name are loaded in the future.

The network monitoring module 310 may be configured to update the records in the data repository 315 based on the network events that occur while the browser loads the web page. More specifically, the network monitoring module 310 may identify content domain names associated with the network events and update a record for the domain name based on the identified content domain names. According to one aspect of the subject technology, the network monitoring module 310 may update the same records that the scanning module 305 updates. In other aspects, however, the modules 305 and 310 may update separate sets of records. An example record for a domain name is discussed below with respect to FIG. 4.

Figure 4:
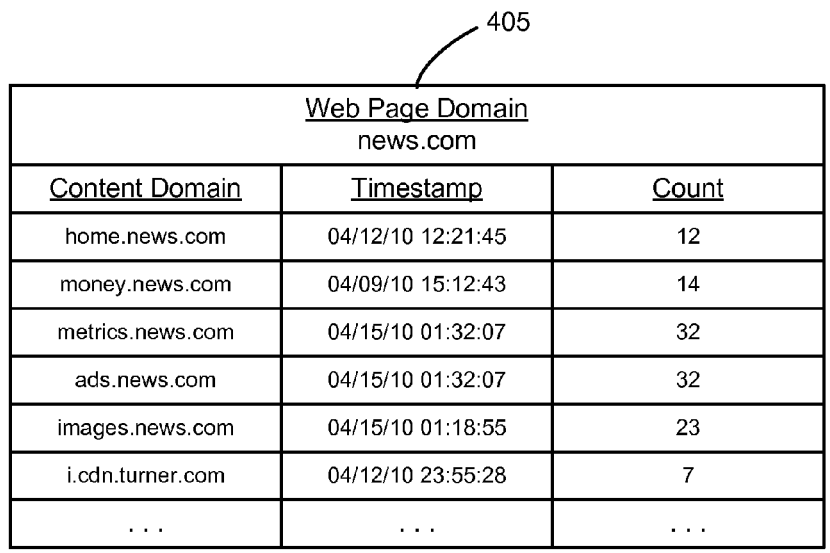
FIG. 4 is a block diagram illustrating an example web page domain record, in accordance with one aspect of the subject technology.

FIG. 4 is a block diagram illustrating an example web page domain record 400, in accordance with one aspect of the subject technology. The web page domain record 400 may include a field for a web page domain name 405 ("news.com") and one or more entries in the web page domain record 400. Each entry in the web page domain record 400 may include a content domain name that has been associated with the web page domain name 405, a timestamp indicating the most recent occasion that the content domain name has been associated with the web page domain name 405, and a count indicating the number of times the content domain name has been associated with the web page domain name 405 that have been identified. According to one aspect of the subject technology, the count may be for a specific period of time (e.g., the past month).

Referring back to FIG. 3, the content domain module 325 may be configured to anticipate the content domain names that will be used to load a web page using the web page domain records stored in the data repository 315. In one aspect, the content domain module 325 may determine that a browser is beginning loading a web page and identify the domain name associated with the web page being loaded. The content domain module 325 will find a web page domain record 400 that corresponds with the domain name of the web page being loaded by the browser and identify one or more content domain names that may be used to load the web page.

According to various aspects of the subject technology, the content domain module 325 may be configured to use the count and/or the timestamp for each content domain name to determine whether or not to initiate Domain Name System (DNS) requests for particular content domain names. In one aspect, the content domain module 325 may identify content domain names with entries that have a count that exceeds a count threshold and initiate a Domain Name System (DNS) request for the identified content domain names.

According to another aspect, the content domain module 325 may calculate a probability that the content domain name will be requested when loading a web page having the domain name. For example, the probability that a content domain name will be requested for a particular web page domain name may be increased if there is a high count number. In another aspect, the probability that a content domain name will be requested for a particular web page domain name may be decreased if the timestamp is too old.

The content domain module 325 may use the calculated probabilities to identify which content domain names to initiate a DNS request for. In one aspect, the content domain module 325 may initiate DNS requests for content domain names with a probability above a threshold probability. In another aspect, the content domain module 325 may initiate DNS requests for a certain number of content domain names with the highest probability values (e.g., the 8 content domain names with the highest probability values).

By using the records to anticipate which content domain names will be used when loading a web page, the content domain module 325 may initiate the DNS requests for one or more of the identified content domain names before the browser is able to determine the actual content domain names needed by the web page. Accordingly, if the browser determines that one of the anticipated content domain names is actually needed to load the web page, the domain anticipation system 300 may enable the web page to load more quickly by initiating the DNS requests for the anticipated content domain names earlier than the browser would have otherwise.

According to various aspects of the subject technology, one or both the scanning module 305 and the network monitoring module 310 may be used to update the web page domain records 400 on the data repository 315. In one aspect, one of the modules may be used as a default, however, if the performance of the module does not meet performance standards, the domain anticipation system 300 may switch to using the other module.

To this end, the performance module 320 may be configured to manage the modules used to anticipate content domain names needed to load a web page. For example, the performance module 320 may monitor the performance of a first module (e.g., the average time or computation resources needed by modules). If the performance of the first process is not adequate, the performance module 320 may switch to a second module.

Figure 5:
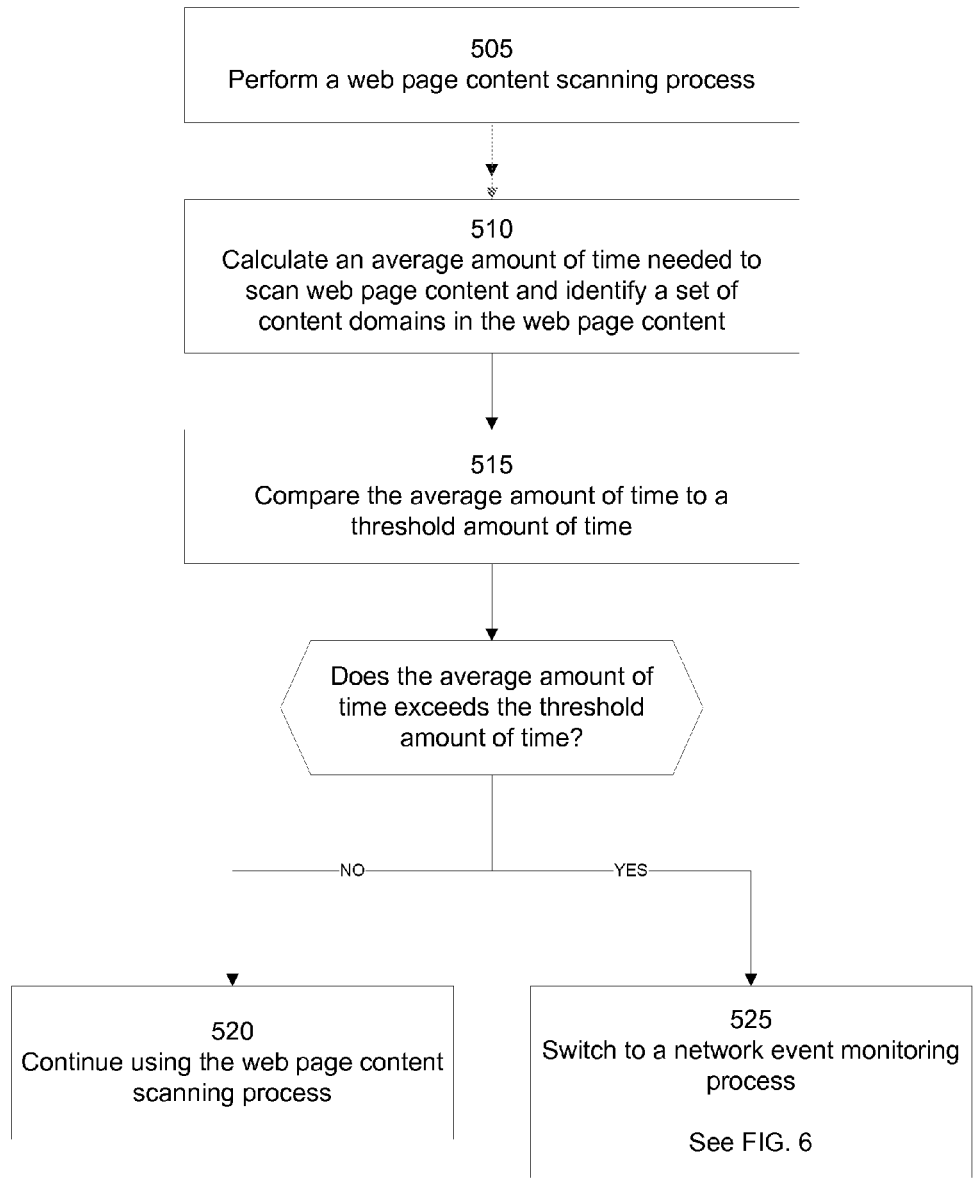
FIG. 5 is a flow chart illustrating an example process for anticipating content domain names to be used by a browser, according to one aspect of the subject technology.

For example, FIG. 5 is a flow chart illustrating an example process 500 for anticipating content domain names to be used by a browser, according to one aspect of the subject technology. Although the steps in process 500 are shown and described in a particular order, certain steps, including steps not shown, may be performed in different orders or at the same time. Furthermore, although the steps are described as being performed by components of the domain anticipation system 300 of FIG. 3, the steps are not limited to being performed by these components and may be performed by other components, other systems, or other entities.

The process 500 may include, at step 505, where the scanning module 305 may perform the web page scanning process to anticipate content domain names. The web page content scanning process may include detecting the loading of a web page having a URL which contains a domain name. According to one aspect, the scanning module 305 may detect a request to load a web page, which may include, for example, a user inputting a URL into the browser or selecting a link associated with a URL in the browser.

After the browser retrieves the web page from a web server, the scanning module 305 may scan the content of the web page and identify content domain names referenced in the web page. The scanning module may then store an association of the identified content domain names and the domain name of the web page being loaded by updating a record in the data repository 315 that corresponds with the domain name of the web page.

When a subsequent request to load a web page having a URL containing the same domain name is received, the content domain module 325 may locate the record that corresponds with the domain name and use the record to anticipate which content domain names will be referenced in the requested web page. The content domain module 325 may then initiate DNS requests for one or more of the anticipated content domain names.

During this process, the performance module 320 may track the amount of resources needed to perform the process and/or calculate performance metrics for the process. If the performance metrics do not meet standards for the process, the domain anticipation system 300 may switch to a network event monitoring process. For example, the performance module 320 may record the amount of time it takes to scan the content of a web page and identify content domain names referenced in the web page.

After a certain number of scans or after a predetermined period of time, the performance module 320 may calculate the average amount of time needed to scan a web page at step 510 and compare it with a threshold amount of time at step 515. If the average amount of time needed to scan a web page does not exceed the threshold amount of time, the system may continue to use the web page content scanning process at step 520. However, if the average amount of time exceeds the threshold amount of time, at step 525, the performance module 320 may be configured to switch to a network event monitoring process such as the process illustrated in FIG. 6.

Figure 6:
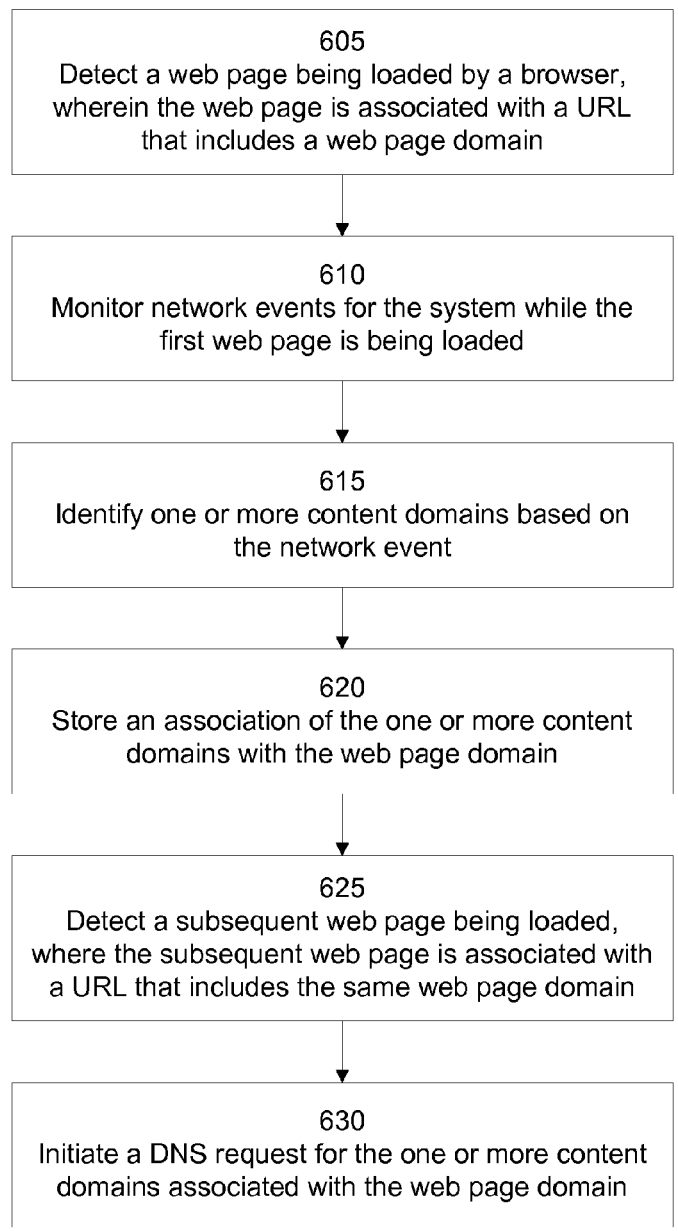
FIG. 6 is a flow chart illustrating a process for anticipating content domain names to be used by a browser by monitoring network events, in accordance with one aspect of the subject technology.

FIG. 6 is a flow chart illustrating a process 600 for anticipating content domain names to be used by a browser by monitoring network events, in accordance with one aspect of the subject technology. Although the steps in process 600 are shown and described in a particular order, certain steps, including steps not shown, may be performed in different orders or at the same time. Furthermore, although the steps are described as being performed by components of the domain anticipation system 300 of FIG. 3, the steps are not limited to being performed by these components and may be performed by other components, other systems, or other entities.

At step 605, the network monitoring module 310 may detect the loading, in a browser, of a web page associated with a URL containing a domain name (e.g., a user may have inputted a URL into the browser or clicked a link containing a URL). In response to the loading of the web page, at step 610, the network monitoring module 310 monitor network events for the system for a period of time. In one aspect, the period of time may begin when the loading of the web page is first detected at step 605 and end when the browser has completed loading the web page. According to another aspect, however, period of time may be a predetermined or fixed period of time.

The network monitoring module 310 may use the detected network events, at step 615, to identify one or more content domain names associated with the domain name of the web page. For example, the network events may include a DNS page. requests to translate domain names found in the web page into an IP address. The domain name associated with the DNS request may be identified as one of the content domain names associated with the domain name of the web page.

At step 620, the network monitoring module 310 may store associations between the identified content domain names and the domain name of the web page request in the data repository 315 so that they may be used when other web pages are loaded. For example, when the loading of a subsequent web page is detected at step 625, the network monitoring module 310 may identify content domain names associated with the domain name of the subsequent web page being loaded and initiate a DNS request for one or more of the associated content domain names at step 630.

Figure 7:
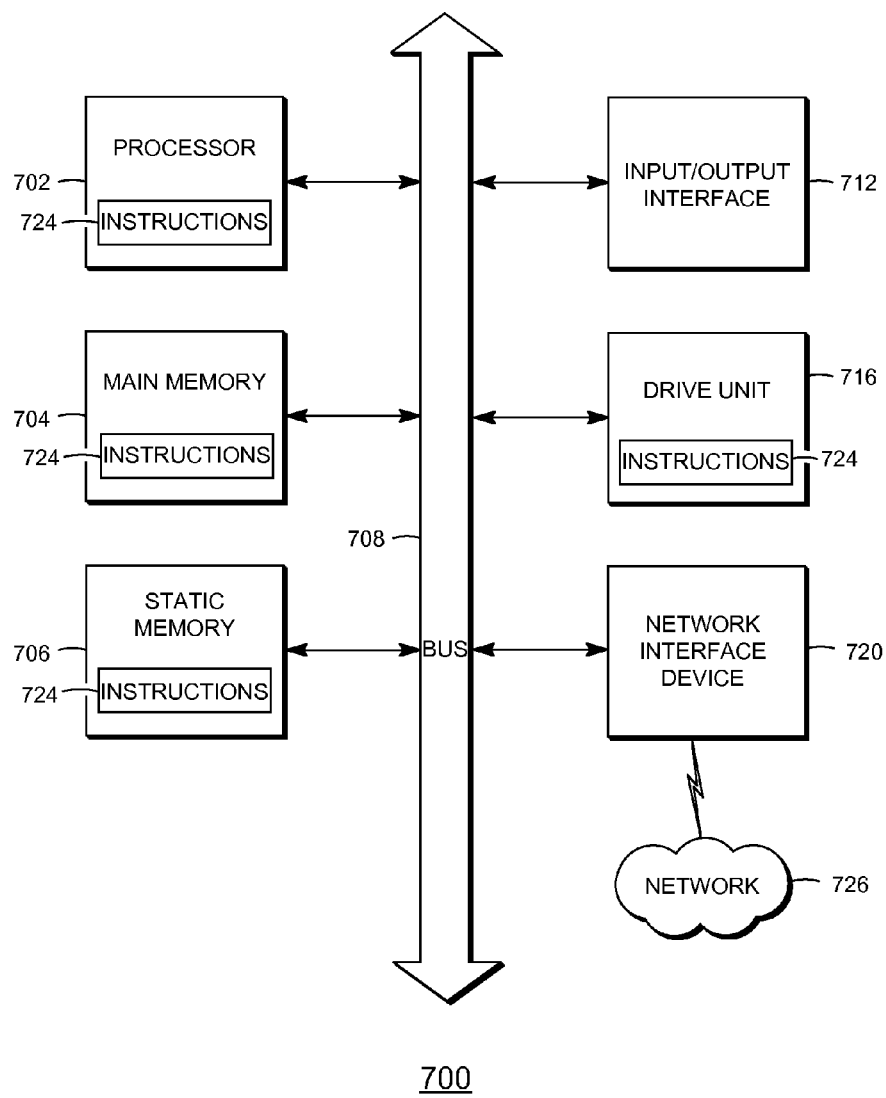
FIG. 7 is a block diagram illustrating an example computer system with which any of the systems and/or servers of FIG. 1 may be implemented, in accordance with one aspect of the subject technology.

FIG. 7 is a block diagram illustrating an example computer system with which any of the systems and/or servers of FIG. 1 may be implemented, in accordance with one aspect of the subject technology. In certain aspects, the computer system 700 may be implemented using hardware or a combination of software and hardware, either in a dedicated server, or integrated into another entity, or distributed across multiple entities.

The example computer system 700 includes a processor 702, a main memory 704, a static memory 706, a disk drive unit 716, and a network interface device 720 which communicate with each other via a bus 708. The computer system 700 may further include an input/output interface 712 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 702 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 724 embodying any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media. The instructions 724 may further be transmitted or received over a network 726 via the network interface device 720.

The machine-readable medium may be a single medium or multiple media (e.g., a centralized or distributed database, and/or associated caches and servers) that store the one or more sets of instructions. The machine-readable medium may include the drive unit 716, the static memory 706, the main memory 704, the processor 702, an external memory connected to the input/output interface 712, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

What is claimed is:

1. A method for anticipating, by a networked device, content domain names to be used by a browser, the method comprising:
   loading a first web page associated with a domain name;
   scanning content of the first web page to identify content domain names in the first web page or detecting network events associated with the loading of the first web page, wherein the network events are associated with one or more content domain names used in the loading of the content of the first web page, and wherein the scanning of the content or the detecting of the network events is based on an average amount of time needed to perform a scanning method for anticipating content domains; and
   storing, in a data repository, associations of the one or more content domain names with the domain name of the first web page, wherein at least one content domain name is stored in a web page domain record for the domain name of the first web page;
   wherein, in a subsequent loading of a second web page associated with the domain name of the first web page, the stored associations are retrieved to automatically initiate a Domain Name System (DNS) request for at least one of the one or more content domain names, and-wherein the DNS request is automatically initiated before the browser has initiated a DNS request for the second web page and before the browser has completed retrieving the second web page from a web server during the loading of the second web page.

2. The method of claim 1, wherein the method further comprises loading another web page by initiating DNS requests for content domains anticipated by scanning content of previously loaded web pages.

3. The method of claim 1, wherein the detecting of the network events is performed if the average amount of time needed to perform the scanning method exceeds a threshold amount of time.

4. The method of claim 1, the network events are network events for a system on which the browser resides.

5. The method of claim 1, wherein the first web page comprises a Uniform Resource Locator (URL) containing the domain name.

6. The method of claim 5, wherein the second web page comprises a second URL containing the domain name, and wherein the first URL is different from the second URL.

7. The method of claim 1, wherein the network events comprise a DNS request to translate a content domain name into an Internet Protocol (IP) address.

8. The method of claim 1, further comprising:
   calculating, for each of the one or more content domain names, a probability that the content domain will be used to load a subsequent web page associated with the domain name; and
   wherein the DNS request for the at least one or more content domain names is initiated based on the probability that the content domain name will be used to load the subsequent web page.

9. A system for anticipating content domain names to be used by a browser, the system comprising:
   one or more processors; and
   a machine-readable medium comprising instructions stored therein, which when executed by the one or more processors, cause the one or more processors to perform operations comprising:
   loading a first web page associated with a domain name,
   scanning content of the first web page to identify content domain names in the first web page or detecting network events associated with the loading of the first web page, wherein the network events are associated with one or more content domain names used in the loading of the content of the first web page, and wherein the scanning of the content or the detecting of the network events is based on an performance metric associated with a scanning method for anticipating content domains, and storing, in a data repository, associations of the one or more content domain names with the domain name of the first web page, wherein at least one content domain name is stored in a web page domain record for the domain name of the first web page, wherein, in a subsequent loading of a second web page associated with the domain name of the first web page, the stored associations are retrieved to automatically initiate a Domain Name System (DNS) request for at least one of the one or more content domain names, and wherein the DNS request is automatically initiated before the browser has initiated a DNS request for the second web page and before the browser has completed retrieving the second web page from a web server during the loading of the second web page.

10. The system of claim 9, wherein the performance metric associated with the scanning method is an average amount of time needed to load another web page by initiating DNS requests for content domains anticipated by scanning content of previously loaded web pages.

11. The system of claim 9, wherein the network events are network events associated with the browser.

12. The system of claim 9, wherein the subsequent web page associated with the domain name comprises a first Uniform Resource Locators (URL) containing the domain name.

13. A non-transitory machine-readable medium comprising instructions stored therein, which when executed by a machine, cause the machine to perform operations comprising:

loading a first web page associated with a domain name;

scanning content of the first web page to identify content domain names in the first web page or detecting network events associated with the loading of the first web page, wherein the network events are associated with one or more content domain names used in the loading of the content of the first web page, and wherein the scanning of the content or the detecting of the network events is based on an average amount of time needed to perform a scanning method for anticipating content domains; and storing, in a data repository, associations of the one or more content domain names with the domain name of the first web page, wherein at least one content domain name is stored in a web page domain record for the domain name of the first web page; wherein, in a subsequent loading of a second web page associated with the domain name of the first web page, the stored associations are retrieved to automatically initiate a Domain Name System (DNS) request for at least one of the one or more content domain names, and wherein the DNS request is automatically initiated before the browser has initiated a DNS request for the second web page and before the browser has completed retrieving the second web page from a web server during the loading of the second web page.

14. The non-transitory machine-readable medium of claim 13, wherein the operation further comprises loading another web page by initiating DNS requests for content domains anticipated by scanning content of previously loaded web pages.

15. The non-transitory machine-readable medium of claim 13, wherein the detecting of the network events is performed if the average amount of time needed to perform the scanning method exceeds a threshold amount of time.

16. The non-transitory machine-readable medium of claim 13, wherein the subsequent web page associated with the domain name comprises a first Uniform Resource Locators (URL) containing the domain name.

17. The non-transitory machine-readable medium of claim 13, wherein the network events comprise a DNS request to translate a domain name into an Internet Protocol (IP) address, and wherein the identifying of the one or more content domain names based on the network events comprises identifying the domain name in the DNS request.

* * * * *